United States Patent [19]
Thivet

[11] Patent Number: 5,928,538
[45] Date of Patent: Jul. 27, 1999

[54] CIGAR LIGHTER WITH A PROTECTIVE DEVICE, ESPECIALLY FOR A MOTOR VEHICLE

[75] Inventor: Gilles Thivet, Labruguiere, France

[73] Assignee: Valeo Vision, Bobigny Cedex, France

[21] Appl. No.: 08/799,256

[22] Filed: Feb. 14, 1997

[30] Foreign Application Priority Data

Feb. 16, 1996 [FR] France ................................ 96 01959

[51] Int. Cl.$^6$ ........................................................ B60N 3/14
[52] U.S. Cl. ............................................ 219/264; 219/517
[58] Field of Search .................................... 219/264, 263, 219/267, 270, 517; 361/264–266; 123/145 A

[56] References Cited

U.S. PATENT DOCUMENTS

| | | |
|---|---|---|
| 4,459,464 | 7/1984 | Oda et al. . |
| 5,173,593 | 12/1992 | Ogino et al. . |

FOREIGN PATENT DOCUMENTS

| | | |
|---|---|---|
| 2436942 | 5/1980 | France . |
| 2477268 | 9/1981 | France . |
| 40 42 043 | 7/1991 | Germany . |
| 1564037 | 4/1980 | United Kingdom . |
| 2042701 | 9/1980 | United Kingdom ................... 219/264 |
| 95/19273 | 7/1995 | WIPO . |

*Primary Examiner*—John A. Jeffery
*Attorney, Agent, or Firm*—Morgan & Finnegan, LLP

[57] ABSTRACT

A cigar lighter, especially for a motor vehicle, includes a lighter body, or power socket comprising a body sleeve, which carries insulating rings, a two-fingered clip, and power supply tongues, all of which are assembled to the base portion of the lighter body sleeve by a fastening member. The cigar lighter is equipped with a device for protection against overheating. The second power supply tongue is insulated from the base of the lighter body sleeve. The second power supply tongue is connected electrically to the base through the protective device, which is a safety fuse. The second insulating ring is so configured as to contain the fuse inside it. The fastening member fastens the fuse carrier to the base of the lighter body.

31 Claims, 7 Drawing Sheets

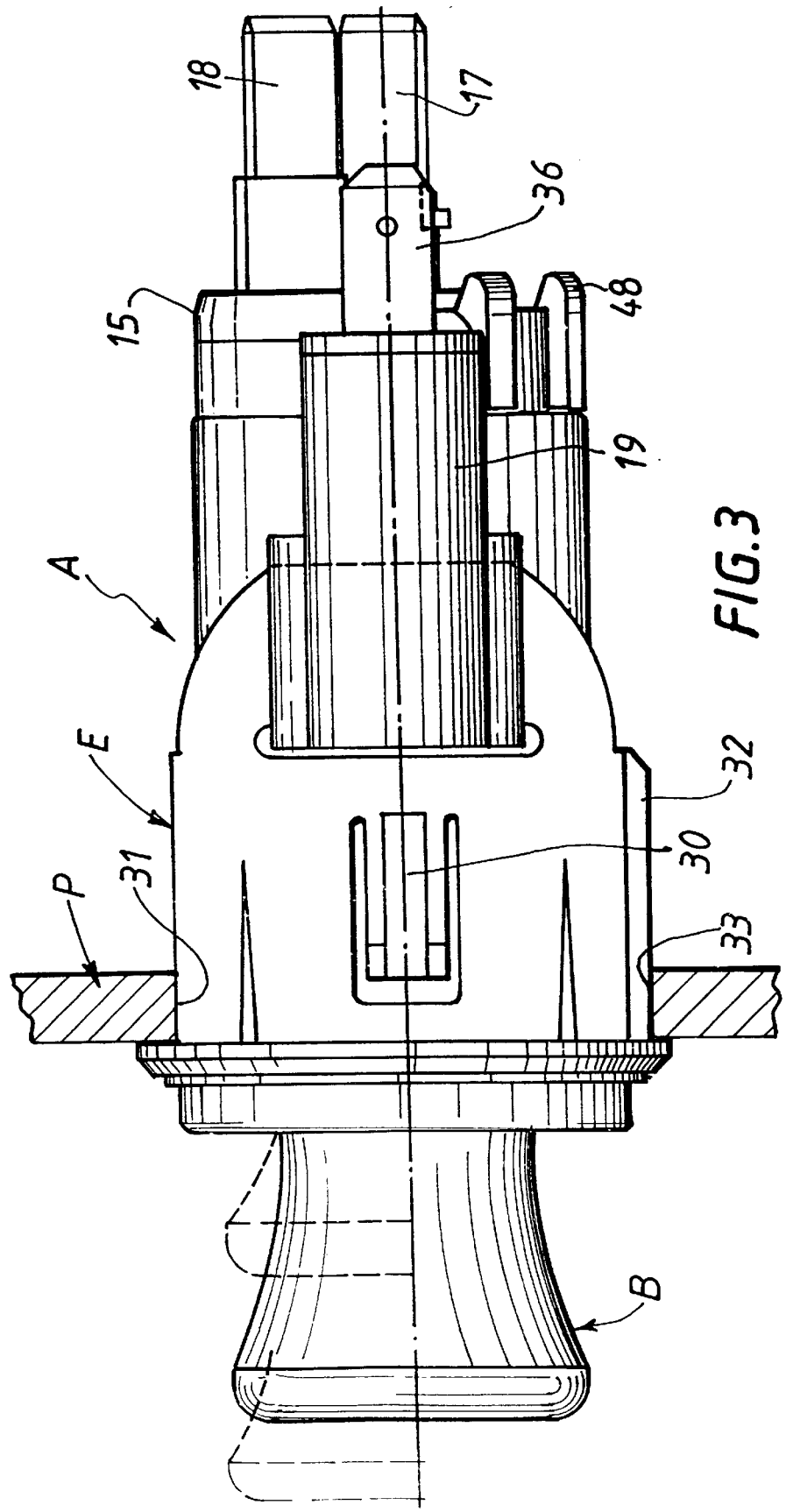

CIGAR LIGHTER WITH A PROTECTIVE DEVICE, ESPECIALLY FOR A MOTOR VEHICLE

FIELD OF THE INVENTION

The present invention relates to cigar lighters, especially for motor vehicles, and is concerned more particularly with a cigar lighter which includes a fixed lighter body or power socket.

BACKGROUND OF THE INVENTION

As is well known, the lighter body, or socket, of a cigar lighter acts as a power point or current supply element, in that it serves both as a receptacle for a heater plug, for lighting cigars or cigarettes, and as a socket into which a plug of an accessory may be inserted.

To this end, the lighter body, for receiving a removable heater plug, includes for this purpose an electrically conductive lighter body sleeve having a base portion, on either side of which there are mounted, firstly, within the said sleeve, a two-fingered clip and a first electrically insulating member, referred to as a first insulating ring, and secondly, on the outside of the said body sleeve, an electrical power supply tongue, referred to as a second power supply tongue and associated with the said body sleeve, with a second electrically insulating member, referred to as a second insulating ring, being interposed axially between the second power supply tongue and a further electrical power supply tongue referred to as the first power supply tongue, the first power supply tongue being associated with the two-fingered clip and being connected electrically to the said clip by means of a fastening member which assembles the clip, the insulating rings and the power supply tongues to the base portion of the body sleeve, the cigar lighter further including a protective device for giving protection against overheating.

It is common practice to provide a device for giving protection against overheating. In this connection, under some circumstances the fingers of the two-fingered clip may remain in engagement with the end cup element of the heater plug, even after the heater plug has reached the required temperature. In addition, a short circuit can sometimes occur. These conditions can cause a fire, a danger which is aggravated by the fact that the lighter body is normally secured on a fixed wall of the vehicle, which is commonly made of a plastics material.

It has been proposed, accordingly, in French patent specification No. FR 2 338 822A, to give the first insulating ring a recess in which a fusible body is mounted. This body, or fuse, melts at a predetermined temperature, and sets up a short circuit.

It is similarly possible to cause a short circuit by means of a generally L-shaped safety tongue, which is interposed between the base portion of the body sleeve and the second power supply tongue. This safety tongue makes electrical contact with the first power supply tongue in the event of overheating, in the manner described in International Patent publication No. WO95/19273.

These arrangements are not entirely satisfactory, because they make it necessary to change the fuse on the fascia panel, or the like, in which the cigar lighter is mounted. In addition, their nature is such that they increase the axial distance between the two-fingered clip and the base portion of the lighter body sleeve, and the latter is then also of a non-standard type.

It might also be considered that the protective device could be incorporated into the heater plug, but this would involve modifying the latter. In addition, when a plug is inserted into the lighter body, the protection would be lost.

U.S. patent specification No. 4,459,464, and German patent specification DE 40 42 043A, for example, disclose arrangements in which the protective device is fitted on the outside of the lighter body sleeve. In that case, only one power supply tongue is provided, namely the first tongue which is associated with the two-fingered clip, the first tongue being insulated from the base of the lighter body sleeve by the second insulating ring in contact with the body sleeve base. This first tongue serves for fastening one of the ends of a fuse, the other end of which is fixed to a supplementary component, separate from the first tongue, by means of a third electrical insulating ring.

This supplementary component serves as an abutment for a resilient ring which is associated with a nut of the fastening member, the latter being in this case in the form of a bolt. None of this is applicable to an arrangement having two power supply tongues carried by the base portion of the lighter body sleeve. In addition, the fuse is not physically protected, and it can become damaged during handling before the lighter body is fixed on the fixed wall of the vehicle. And even after the lighter body has been fitted on this fixed wall, the fuse can still be damaged, for example by a connecting wire, in view of the fact that the lighter body is fitted in an environment where there are numerous other items of equipment.

DISCUSSION OF THE INVENTION

An object of the present invention is to overcome the above mentioned drawbacks.

Another object of the invention is to provide an arrangement having a protective device which makes it unnecessary to provide a lighter body sleeve of a non-standard type.

A further object of the invention is to provide an arrangement with a protective device which makes it unnecessary to change another fuse, while at the same time being applicable to cigar lighters with two electrical power supply tongues.

Yet another object of the invention is to provide an arrangement in which a protective device is furnished in a simple and inexpensive way, while being simple to fit.

According to the invention, a cigar lighter, comprising a lighter body, for receiving a removable heater plug and including for this purpose an electrically conductive lighter body sleeve having a base portion, on either side of which there are mounted, firstly, within the said sleeve, a two-fingered clip and a first electrically insulating member, referred to as a first insulating ring, and secondly, on the outside of the said body sleeve, an electrical power supply tongue, referred to as a second power supply tongue and associated with the said body sleeve, with a second electrically insulating member, referred to as a second insulating ring, being interposed axially between the second power supply tongue and a further electrical power supply tongue referred to as the first power supply tongue, the first power supply tongue being associated with the two-fingered clip and being connected electrically to the said clip by means of a fastening member which assembles the clip, the insulating rings and the power supply tongues to the base portion of the body sleeve, the cigar lighter further including a protective device for giving protection against overheating, is characterised in that electrical insulating means are interposed between the second power supply tongue and the base portion of the lighter body sleeve, in that the second power supply tongue is located close to the base portion of the lighter body sleeve and is connected electrically to the base portion through an interposed fuse for electrical and thermal safety, the fuse constituting the protective device and being adapted to give protection against both overheating and excess current, and in that the second insulating ring is so configured as to accommodate the fuse within it, the fuse being carried by a support member which is assembled to the base portion of the lighter body sleeve by means of the fastening member.

The invention enables the lighter body sleeve to be retained in its standard form. The same is true as regards the first insulating member or ring, and the two-fingered clip. Standardisation is thereby improved.

The lighter body still has two electrical power supply tongues. Finally, although the second power supply tongue and the second insulating ring are modified, this is very easily done. The first power supply tongue can be retained in standard form. The illuminating ring which forms part of some types of cigar lighter is not modified at all.

The arrangement with a protective device in accordance with the invention involves no increase in axial size, nor any complication of the fitting of the cigar lighter itself. In this connection, the space available between the second insulating ring and the axial portion of the power supply tongues is made use of. In addition, the second insulating ring prevents any contact occurring between the first power supply tongue and the fuse. In the event of overheating, the fuse blows (or its fusible element melts). In the event of excess current, i.e. a short circuit, the fuse will melt by Joule effect. The melting point is of the order of 110° C.

All of this is made possible due to the fact that the fuse is close to the lighter body sleeve. The fuse is then of an inexpensive kind, and operates at temperatures lower than would be the case if it were associated with the first power supply tongue. The fuse is also more reliable and more accurate, due especially to the fact that the lighter body sleeve heats up in a more uniform way than the first power supply tongue, which has a small surface area as compared with that of the lighter body sleeve.

Due to the second insulating ring, it is possible to use various forms of fuse. To achieve this, all that is necessary is to configure the second insulating ring accordingly.

In one embodiment of the invention, the fuse is carried by a separate electrically conductive fuse carrier which is in contact with the base portion of the lighter body sleeve. Electrical insulating means are interposed between the fuse carrier and the second power supply tongue, the latter having contact means for contact with one end of the fuse. The fuse is located in superelevation with respect to (and therefore lies axially beyond) the base portion of the lighter body sleeve.

It will be appreciated that the second power supply tongue is not greatly modified, and that the thickness of the fuse carrier can be made less than that of the second power supply tongue.

In a second embodiment of the invention, the second power supply tongue is so configured as to carry the electrical and thermal safety fuse directly by means of fastening means, being insulated electrically from the fuse. In that case, preferably, the second power supply tongue is connected to the lighter body sleeve through the said fuse, the fuse being in electrical contact, firstly with the base portion of the body sleeve, and secondly with the second power supply tongue. This second embodiment is of particular advantage, because it leads to a reduction in the number of components in the lighter body, since the second power supply tongue carries the fuse directly. This enables the length of the connection between the contact means carried by the second tongue, on the one hand, and the fuse on the other hand, to be reduced, thus improving reliability and also response time.

In addition, it also enables the axial size of the lighter body unit to be reduced, because the fuse is in electrical contact with the base of the lighter body sleeve. As a result of this, the sensitivity of the fuse to vibrations is reduced.

It will be appreciated, especially in terms of reduction in the time needed for fitting the lighter body in place, that it is then possible to form a sub-assembly which comprises the second power supply tongue and the fuse. For this purpose, all that is necessary is to cover the second power supply tongue (i.e. the surface of the base of the latter that extends parallel to the base of the lighter body sleeve) with an electrical insulator, which may be achieved by powder coating or by adhesive application. In another version, the electrical insulator may be of a self-adhesive type, or in general terms, any type that will bond to the underlying surface.

The said second power supply tongue is configured accordingly, so that it preferably has means for gripping the fuse, which fails in a very precise manner in the event of overheating, due to the fact that it is in direct contact with the base of the lighter body sleeve.

In all cases the second insulating ring masks the fuse. This can easily be achieved because the said second insulating ring is preferably made by moulding, so that it has a projecting portion in which the fuse can be lodged. The fuse can then be a cheap, commercially available fuse of the type having an outer casing in the form of a capsule, which may for example be electrically conductive. The fuse is physically protected, and runs no danger of being damaged by any equipment, or by any electric wire located close to the lighter body of the cigar lighter.

Before the lighter body is fitted on to its fixed wall, there is no danger of damage to the fuse during handling or storage of the latter.

In general terms, the fuse is contained within a cavity within the second insulating ring, and preferably in a cavity formed within the thickness of the latter. This enables the overall axial size of the lighter body unit to be reduced.

The fastening member is preferably removable, so that it is easy to remove the second insulating ring and change the fuse.

It will be appreciated that it is easily possible to recycle a lighter body of a standard type, and to modify it by fitting a second insulating ring, a second power supply tongue, and a fuse, all in accordance with the invention.

Further features and advantages of the invention will appear more clearly on a reading of the following detailed description of some preferred embodiments of the invention, which are given by way of non-limiting example only and with reference to the accompanying drawings.

BRIEF DESCRIPTION OF THE DRAWINGS

FIG. 3 is an outside view of the same cigar lighter, as seen from the top of FIG. 1.

DESCRIPTION OF PREFERRED EMBODIMENTS OF THE INVENTION

Figure 1:
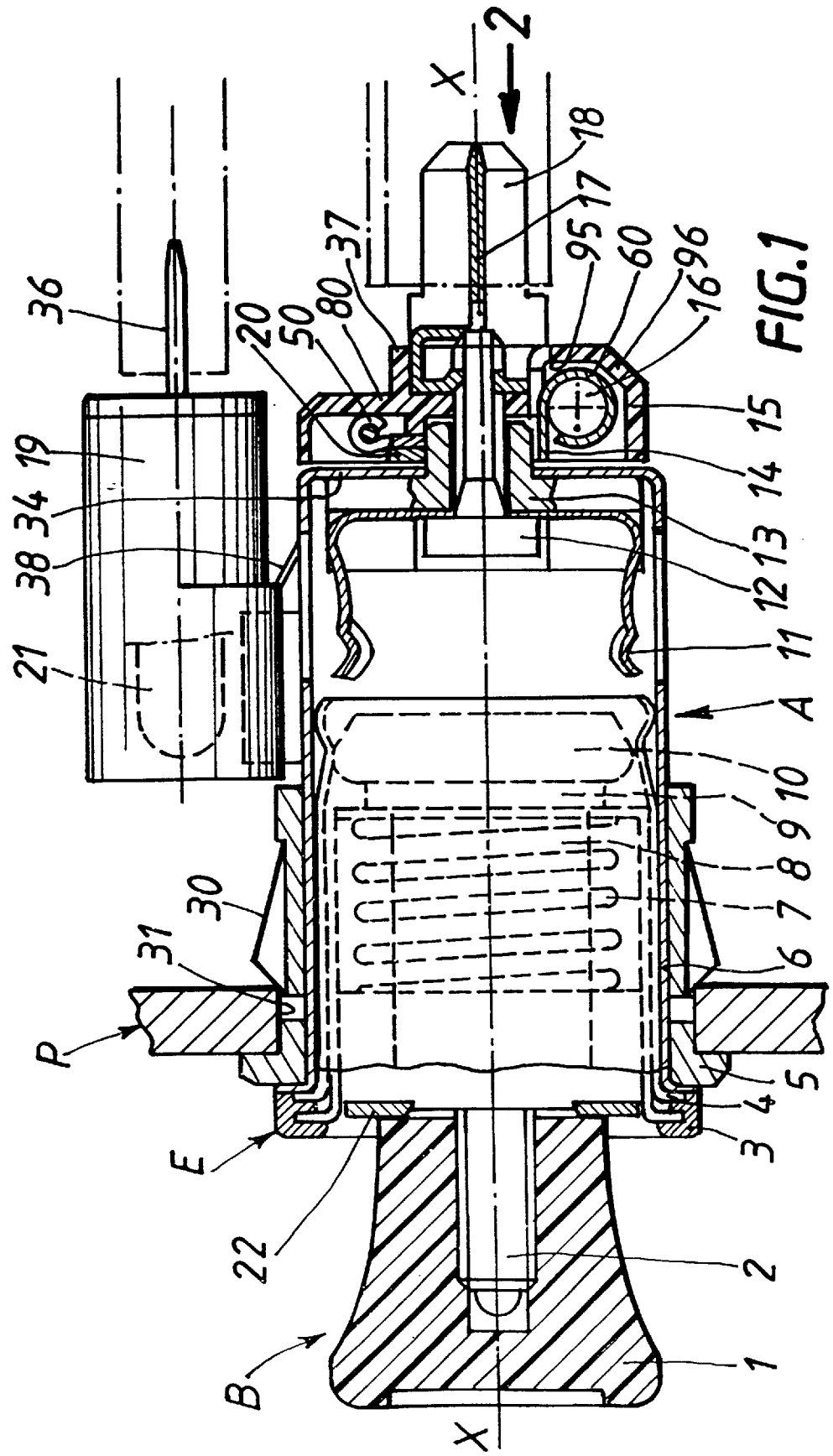
FIG. 1 is a view in axial cross section of a cigar lighter in a first embodiment of the invention, shown in cross section on the line 1—1 in FIG. 2.

The cigar lighter shown in the drawings includes a lighter body A which serves as a receptacle for a removable heating plug B, or for a power supply plug for an accessory. In the various Figures of the drawings, those elements which are identical to each other are given the same reference numerals.

The lighter body A is arranged to be secured directly or indirectly to a fixed wall P of a vehicle, such as a console or a fascia panel. In the embodiments shown in the drawings, the lighter body A is fixed to the wall P by means of an interposed illuminating ring E, which has at its front end an annular portion 5 which makes contact with the outer or front face of the wall P, and which identifies the location of the cigar lighter at night. For this purpose, the illuminating ring E carries, at its rear end, a housing 19 which contains a light source 21, such as a lamp. The illuminating ring E is formed with openings associated with resiliently deformable tongues 30, two of which can be seen in FIG. 1. These tongues 30, which are orientated axially, have a wedge-shaped front end, i.e. the end towards the left in FIG. 1.

In a manner known per se, during fitting of the cigar lighter, the illuminating ring E is introduced into the associated aperture 31 in the wall P until the tongues 30 are deformed radically inwardly, before the tongues relax to their extended position shown in FIG. 1. Once the illuminating ring E has been introduced axially into the aperture 31, the wall P is then sandwiched between the annular portion 5 and the front ends of the tongues 30.

Figure 2:
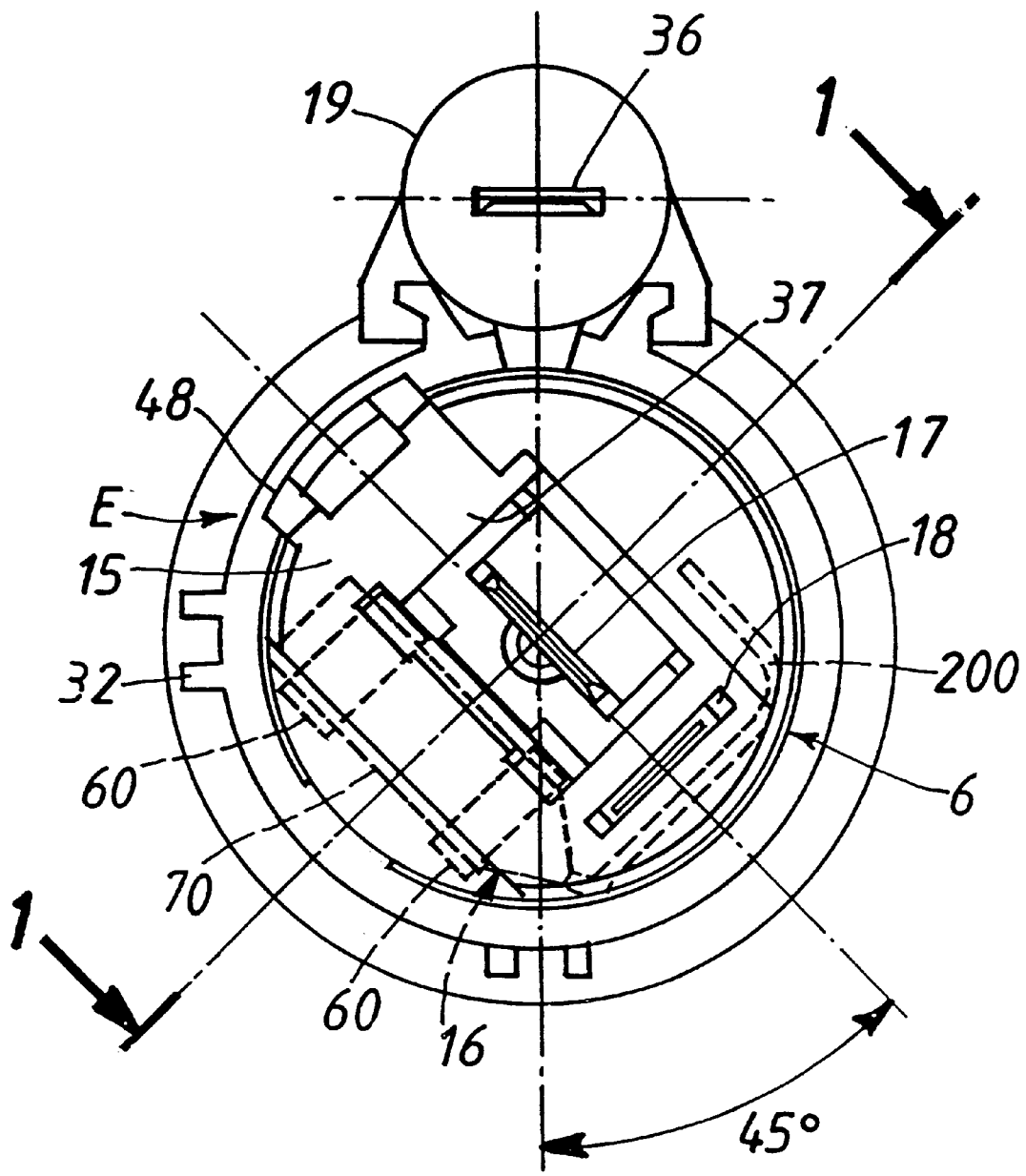
FIG. 2 is a view seen in the direction of the arrow A2 in FIG. 1.

The ring E has an external axial projecting element 32 which defines two guide rails, as can be seen in FIG. 2. These guide rails cooperate with a lug of the fixed wall P, this lug being formed in the periphery of the aperture 31 and defined by slots 33 (FIG. 3) which lie on either side of this lug. The axial projecting element 32 and the lug of the wall 4 constitute a locating element whereby the ring E is located against rotation with respect to the wall P. The illuminating ring E, which in this example is of an electrically insulating material, is therefore connected both axially and in the rotational sense to the wall P, which in this example is of a plastics material.

The electrically insulating material of which the ring E is made is preferably a translucent plastics material. The housing 19 which carries the lamp 21 is of course mounted at the rear end of the ring E in the manner of a drawer: for this purpose, the ring E has two tenons, each of which is engaged in a groove formed in the housing 19, as can be seen in FIG. 2.

A lighter body sleeve 6 is introduced into the illuminating ring E. The body sleeve 6 is of a suitable electrically conductive material, and in this example it is a steel pressing. The sleeve 6 is located in the ring E by locating means 48 between the ring E and an electrically insulating member 15, to be described below. More precisely, this member 15 has axial projections which are engaged in the grooves of the illuminating ring E, so that the locating means consist of these projections and grooves. The locating means, 48, thus enable the lighter body sleeve 6 of the lighter body A to be fitted in a predetermined angular position.

Figure 6:
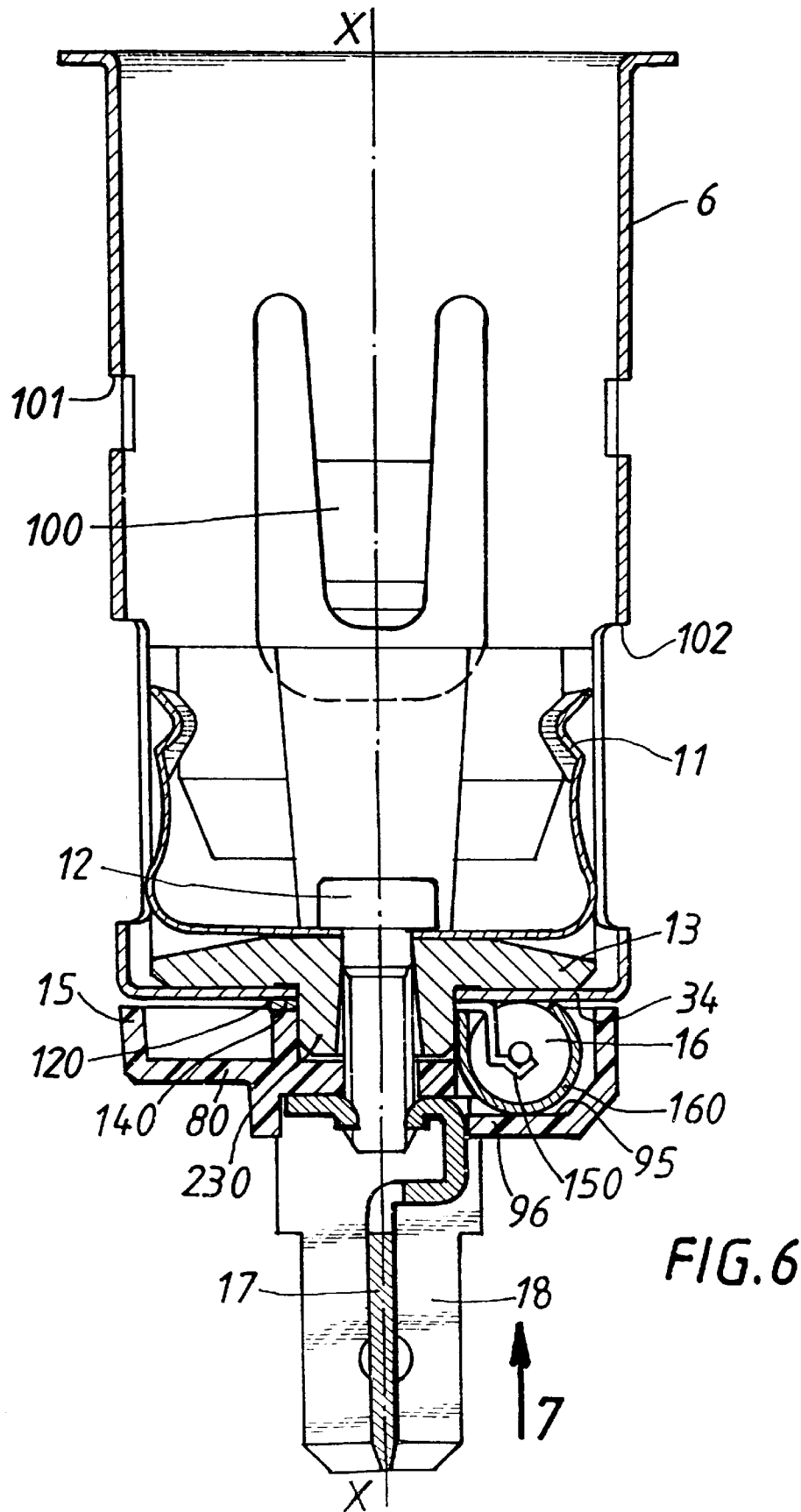
FIG. 6 is a view in axial cross section of a cigar lighter in a second embodiment of the invention, without the illuminating ring.
Figure 7:
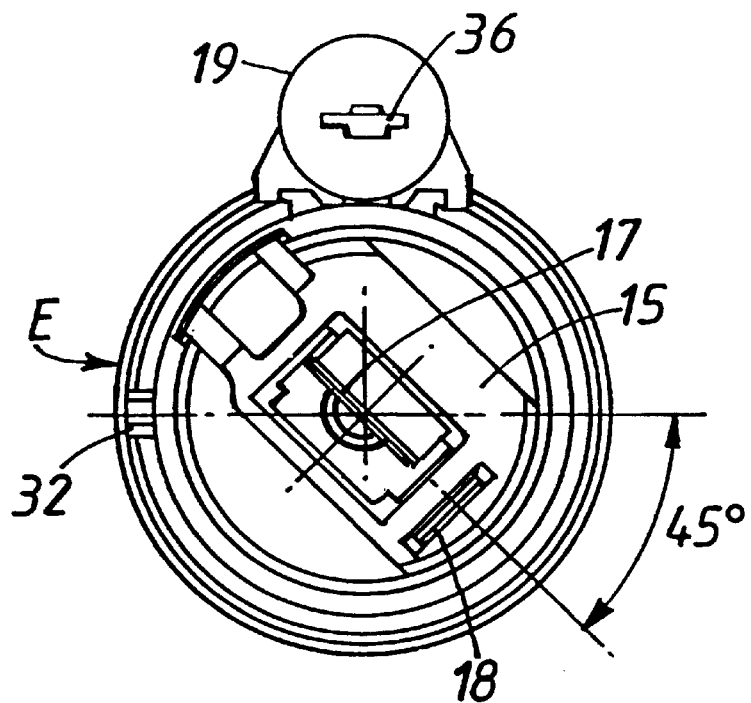
FIG. 7 is a view seen in the direction of the arrow 7 in FIG. 6, with the illuminating ring being shown.
Figure 8:
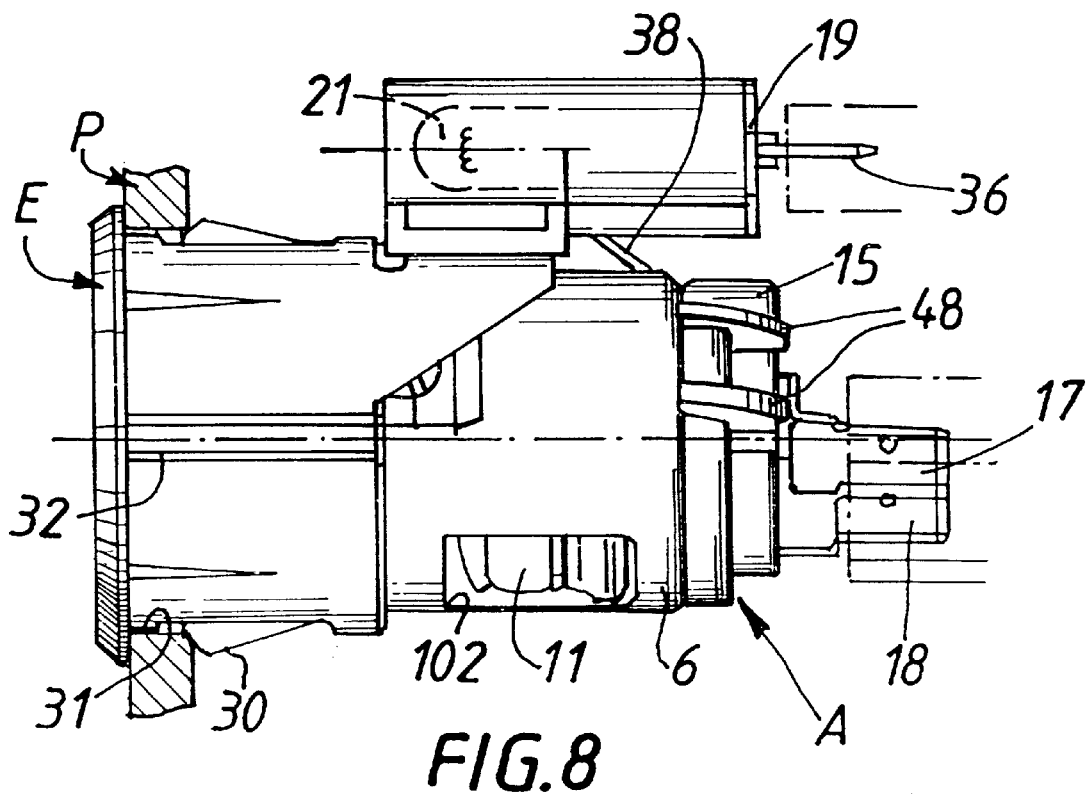
FIG. 8 is a view similar to FIG. 3, for this second embodiment of the invention.

In a manner known per se, the illuminating ring E has local nibs which are engaged in internal notches, indicated by the reference numeral 101 in FIG. 6, of the lighter sleeve body 6, so that the latter is thereby fixed to the ring E by snap fitting, being thereby indirectly secured to the wall P.

In another version, not shown, the lighter body sleeve 6 may be fixed directly to the vehicle wall P.

In the present case, the body sleeve 6 has at its front end a collar portion which bears on the outer or front face of the annular portion 5 of the illuminating ring E, while at its rear end it has a base portion 34, in which a central through hole is formed. The base portion 34 lies at right angles to the axis of axial symmetry X—X of the cigar lighter. The housing 19 carries an inclined projecting tongue 38 which makes contact with the collar body sleeve 6.

An electrical power supply tongue 36 is arranged to be contacted to the positive side of the sidelights (parking lights) of the vehicle, while the body sleeve 6 is arranged to be connected to the negative terminal of the battery of the vehicle via a second electrical power supply tongue 18, in a manner to be described below. The tongues 36 and 38, which are of metal in the present case, take the power supply to the lamp 21.

The body sleeve 6 carries within it a two fingered clip 11, having two axially oriented fingers extending from a disk portion which lies parallel to the base portion 34 of the lighter body sleeve 6. A generally annular, electrically insulating member 13, which is here in the form of a bushing, but which will be referred to as the first insulating ring 13, is interposed axially between the base portion 34 and the disk portion of the two fingered clip 11.

The bushing or ring 13 extends through the central aperture in the base portion 34, in which a centering sleeve 230 portion of the ring 13 (FIG. 4) is inserted. The ring 13 has a central hole, through which a fastener 12 passes. In this example the fastener 12 is a screw, but it may alternatively be a rivet. Its head is engaged on the upper (or front) surface of the disk portion of the two-fingered clip 11, so as to clamp the clip 11 and the insulating ring 13 between the head of the fastener 12 and the base portion 34 of the body sleeve 6.

The screw 12, which is of an electrically conductive material and is in this example of metal, has a threaded shank which passes, outside the body sleeve 6, through the insulating member 15. The centring sleeve portion 230 of the first insulating ring 13 centres the shank of the screw 12.

The insulating member 15 will be referred to herein as the second insulating ring, and in this example it is made of a moulded plastics material. It has a main portion 80 which is generally annular, and which lies parallel to the base portion 34 of the body sleeve 6. The first insulating ring 13 is also of a thermally insulating material, and in this example it is of the thermosetting material "Vyncolite". In the present example the second insulating ring 15 is of filled polyamide 6/6.

A base portion of a first electrical power supply tongue 17 bears on the rear face of the insulating ring 15. This tongue 17 is electrically connected to with the two-fingered clip 11, and is arranged to be connected to the positive terminal of the battery of the vehicle. Its base portion includes a central threaded chimney portion, and is prevented from rotating by means of an external, axially oriented, rib 37 which projects from, and is formed integrally by moulding with, the second insulating ring 15. The rib 37 extends outwardly, away from the body sleeve base portion 34. The tongues 17 and 18, which are in this example of metal, are generally L-shaped, so as to define a shouldered axial portion constituting a connecting means.

The base portions of the tongues 17 and 18 extend at right angles to the axis X—X, with that of the second power supply tongue 18 being close to the body sleeve base portion 34.

The axial portion of the power supply tongue 18 extends through a rectangular aperture which is formed in the second insulating ring 15, so that it is immobilised against rotation with respect to the ring 15. The base portion of the tongue 17 is extended by a sinuous axial portion for cooperation with the rib 37 (see FIG. 2), so as to prevent the tongue 17 from rotating.

Thus, in a manner known per se, the tongue 17 comprises a U-shaped portion (FIGS. 1 and 6), one branch of which constitutes the base of the tongue 17, with its other branch, which is shorter than the first branch, carrying the axial portion of the tongue 17, the base of the U-shaped portion being in contact with the rib.

The second insulating ring 15 thus constitutes a connection insulator, with the base portions, or bases, of the tongues 17 and 18 being disposed in either side of the ring 15, the latter being hollow so as to conceal the base of the second power supply tongue 18. More precisely, and as can be best be seen in FIGS. 1 and 6, the ring 15 has a lateral skirt portion which surrounds the base of the second power supply tongue 18.

As will have been understood from the foregoing, the first power supply tongue 17 constitutes a nut for the screw 12, so that this screw assembles together the two-fingered clip 11, the tongues 17 and 18, and the insulating rings 13 and 15, securing all of these components to the base portion 34 of the lighter body sleeve 6. The screw passes through all these components.

The body sleeve 6 is of course formed with relief openings, which can be seen at 102 in FIG. 6, in the vicinity of the fingers of the clip 11. The clip 11 constitutes a current supply element, and the openings 102 enable the fingers of the clip to be deflected outwardly. The free ends of the fingers of the clip 11 have hooking lugs, the backs of which face towards each other. The fingers are deflected away from each other when the heater plug B is pushed into a heating position in the lighter body A.

The hooking lugs of the fingers of the clip 11 are arranged to hold an electrically conductive end cup element 10 when the plug B is in its pushed-in, or heating, position. In this connection, the end cup element 10 contains within it a heater element which is typically a spiral-wound electrical resistive heating element.

In a manner known per se, the plug B comprises two coaxial parts which are movable axially one with respect to the other against the action of resilient return means, which in this example consist of a coil spring 7. One of the two coaxial parts of the plug is fixed, and includes an ash trap 4 of an electrically conductive material, being of metal in this example. An outer ring 3 is moulded onto the ash trap 4 so as to be secured to the latter.

The ash trap 4 is arranged to make intimate contact with the internal bore of the lighter body sleeve 6, and has at its front end a profiled groove which is adapted (in a manner known per se) to cooperate with the curved ends of axially oriented retaining tongues which can be seen at 100 in FIG. 6. These tongues 100 are pressed out from the wall of the body sleeve 6, so as to project axially from the latter towards the body sleeve base portion 34. They lie outwardly of the two-fingered clip. In addition, a guide tube 8 is fixed to the external ring 3, by moulding the latter onto the tube 8. It should be noted that the ring 3 is of a suitable insulating material, and in this example it is of a plastics material such as polyamide 6/6.

The ring 3 is arranged to abut on the front face of the collar portion at the free end of the body sleeve 6, while the guide tube 8, which is of a suitable electrically conductive material and which in this example is of metal, is surrounded by the ash trap 4, and has a base portion which has a central hole, on which one end of the electrically conductive spring 7 bears.

An electrically insulating ring 9 is interposed axially between the base of the guide tube 8 and the base of the end cup element 10. The movable part of the plug B comprises a metallic guide sleeve, the base of which carries, by means of a fastening rivet, not shown, the insulating ring 9 and the end cup element 10 with its heater element mentioned above. This guide sleeve is itself guided by the base of the guide tube 8, and more precisely by the internal bore of the central aperture in the guide tube 8. At its other end the guide sleeve is fixed to an annular member 2 of electrically and thermally insulating material. This annular member 2 is adapted to slide within the guide tube 8, and also serves as an end abutment for the other end of the spring 7.

At its front end, the annular member 2 has a projecting threaded portion, on which a grip knob 1 is fastened, the knob 1 having an internal screw thread for this purpose. A washer 22 is interposed axially between the knob 1 and the front face of the annular member 2. The latter is of plastics material in this example, such as filled polyamide 6/6, so as to give this component 2 the necessary thermal insulating properties.

The knob 1, which in this example is of suitable plastics material, is so profiled that it can be readily gripped by the user so as to extract the heater plug B from the lighter body A when the above mentioned heater element is hot.

In the manner known per se, the plug B is retained in its normal position by means of its ash trap 4 being engaged by the retaining tongues 100 of the body sleeve 6. In this normal position, the end cup element 10 is spaced away from the two-fingered clip 11, so that no electrical circuit is established. When the user pushes the knob 1 in, the moveable part of the plug B is displaced so that the spring 7 is compressed, and the end cup element 10 comes into engagement with the fingers 11. An electrical circuit is thereby set up through the tongue 17, the screw 12, the clip 11, the end cup element 10, the ash trap 4, the body sleeve 6 and the tongue 18.

The resistive heater element of the plug B becomes heated so that the fingers of the clip 11 dilate. Once a predetermined temperature is reached, the spring 7 enables the end cup element 10 to be extracted from the clip 11, because, at that instant, the return force of the spring becomes greater than the gripping force exerted by the fingers of the clip 11 on the cup element 10. The user hears a click, and can remove the plug B so as to light his cigar or his cigarette.

Reference is now made to FIG. 3, which shows the knob of the plug B in its normal position in full lines and, in broken lines, its pushed-in position and a withdrawing position. The fingers of the clip 11 extend axially towards the open free end of the lighter body sleeve 6. These fingers are liable to be accidentally deformed. In general terms, malfunctioning of the plug B or the two-fingered clip 11 can then occur. The plug B may be pushed into its heating position, for example by a bag, such as a handbag, which is badly placed in the vehicle. Thus, for various reasons, the end cup element 10 may remain in engagement with the clip 11, thus causing the plug B and the lighter body A to become overheated. This gives rise to a risk of fire, especially since the illuminating ring E and the fixed wall P of the vehicle are of plastics materials. In addition, a short circuit may occur, giving rise to excess current.

For this reason, the lighter body A in the present case is equipped with a protective device in order to protect the cigar lighter in the event of overheating or excess current. This device comprises a fuse 16, of a kind affording electrical and thermal safety.

The lighter body sleeve 6 is unmodified, and the fuse 16 is arranged on the outside of the body sleeve 6, which also enables the two fingered clip 11 and the first insulating ring 13 to be also unmodified. It is also possible eventually to recycle a cigar lighter, and to modify it by fitting the fuse 16 in order to improve its electrical and thermal safety.

More precisely, the fuse 16 is fitted in the interior of the second insulating ring 15, the latter being configured accordingly in order to mount the fuse within it.

The second power supply tongue 18, associated with the body sleeve 6, is located close to the base portion 34 of the body sleeve 6, and is connected electrically to the base portion 34 through the fuse 16. To this end, electrically insulating means 20 (FIG. 1) or 120 (FIG. 6) are interposed between the base portion 34 of the body sleeve 6 on the one hand, and on the other hand, the metallic second power supply tongue 18 and first power supply tongue 17.

More precisely, the tongue 18, which is L-shaped like the tongue 17, as already mentioned, comprises a base portion 40 (FIG. 4) or 140 (FIG. 6), lying parallel to the base portion 34 of the sleeve 6, together with an axially oriented portion, which for simplicity is given the reference numeral 18. The base portion 40 or 140 has an inner surface which faces towards the base portion 34, and which is in contact with the insulating means 20 (FIG. 5) or 120 (FIG. 6).

The insulating means 20 of FIGS. 1 to 5 consist of a simple insulating washer. In FIGS. 6 to 11, these insulating means 120 are in the form of a coating of a suitable insulating material which is applied on the base portion 140, for example by powder coating which is carried out on the above mentioned inner surface of the base portion 140.

It is of course possible to reverse the arrangement as between one embodiment and another. Again, the electrically insulating washer 20 can be adhesively secured to the base portion 40 or 140 in order to form a sub-assembly.

The fuse 16 may be of the wire type, as disclosed for example in the above mentioned U.S. patent specification No. 4,459,464, in which the fuse comprises a fusible portion based on lead and tin, surrounded by an envelope of synthetic resin, for example polyethylene, which has a melting point lower than that of the fusible portion.

The invention, as exemplified by the embodiment shown in the drawings, makes it possible, especially on fitting of the fuse within the second insulating ring 15, to employ any desired type of fuse 16, due to the fact that it is easy to give the second insulating ring 15 a suitable configuration to match that of the fuse. The ring 15 can be configured in this way by moulding.

Figures 12, 13:
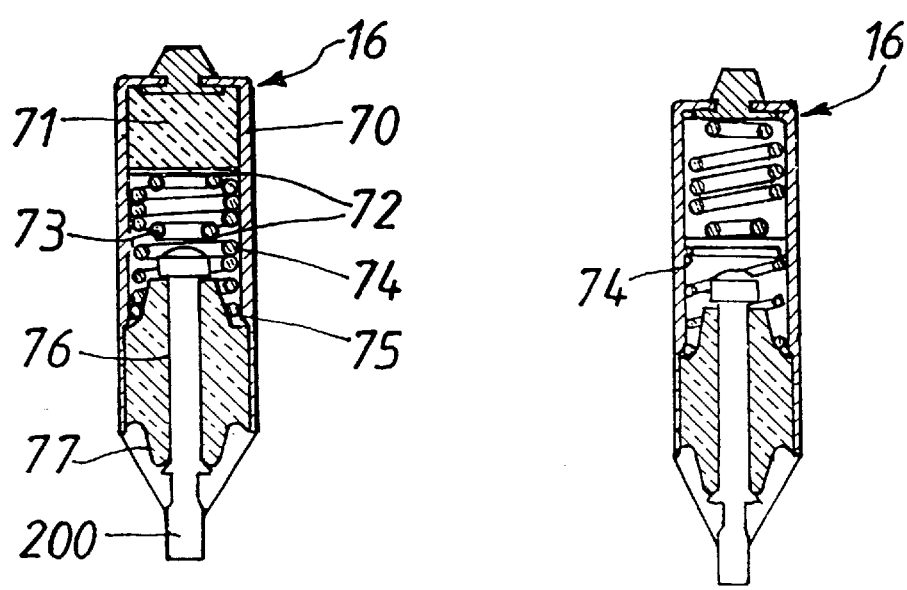
FIG. 12 shows the fuse in axial cross section, in its normal operating mode.
FIG. 13 is a view corresponding to FIG. 12, but shows the fuse after undergoing overheating or excess current.

In this example, the fuse 16 has the construction shown in FIGS. 12 and 13, to which reference is now made. The fuse comprises a capsule 70 containing within it a fusible thermal pellet 71, two disks 72, a compression spring 73, a contact disk 74, an opening spring 75, and a ceramic insulator 76 which surrounds a contact element 200. The capsule 70 is of cylindrical form and is electrically conductive, being in this case of metal. The disks 72 and 74, the contact element 200 and the spring 73 and 75 are also of electrically conductive material, being preferably of metal.

In the present case the pellet 71 is of a material which sublimes (i.e. passes direct from the solid to the gaseous state) in the event of overheating. However, in another version it is of course possible for the material of the pellet 71 to be one that softens and then melts.

The capsule 70 has a base portion at one end, its other end (i.e. the lower end in FIGS. 12 and 13) being closed by a seal 77, for example of epoxy resin, which also connects the contact element 200 and the insulator 76 to the capsule 70.

The compression spring 73 is interposed between the two disks 72, and exerts a pressure on the fusible pellet 71 via the appropriate disk 72 in contact with the pellet. The pellet is thus normally in a compressed condition, as shown in FIG. 12, between the base portion of the capsule 70 and the said disk 72. The opening spring 75 acts on the contact disk 74, which is in engagement on the other disk 72. The disk 74 is provided with generally axially oriented lugs which are in contact with the internal wall surface of the capsule 70.

At its other end, the spring 75 bears on the insulator 76, through which the contact element 200 extends. The inner end of the contact element 200 is profiled, so as to make contact with the disk 74. Thus, in FIG. 12, electrical current can flow normally through the fuse 16, the capsule 70 of which is connected electrically to the contact element 200, via the disk 74 which is in contact with the inner end of the contact element 200. In this example, the springs 73 and 75 are coil springs. In FIG. 12, the spring 73 exerts on the contact disk 74 a force which is greater than that exerted on the same disk by the spring 75.

In the event of overheating of the lighter body sleeve 6, when the end cup element 10 remains in engagement with the fingers of the clip 11 in the manner described above with reference to FIG. 1, the fusible pellet 71 sublimes, so that the compression spring 73 expands. The force exerted by the spring 73 on the contact disk 74 therefore diminishes from a precise threshold value, and the opening spring 75 therefore displaces the contact disk 74 so that the latter ceases to be in contact with the contact element 200. The situation is now as shown in FIG. 13, in which no electrical current is able to flow within the fuse. The fuse therefore now isolates the second power supply tongue 18 (FIG. 1) electrically from the body sleeve 6, and the electrical circuit is interrupted. It may be noted that, in the event of such overheating, the body sleeve 6 can reach temperatures of the order of 150° C. when the plug B is pushed in.

The fusible pellet 71 is designed to fail at a temperature which is for example typically of the order of 110° C., having regard to the thermal inertias involved. In the event of a short circuit, i.e. an excess current in the lighter body A, the pellet 71 will melt by Joule effect.

Thus, having regard to the fact that the body sleeve 6 becomes heated uniformly in the event of overheating, mainly due to radiation, and that it has a high surface area, the invention provides a very precise and very reliable protective device consisting of the electrical and thermal safety fuse 16, due especially to the provision of the springs 73 and 75 and the pellet 71, with which a very precise failure threshold of the fuse can be set.

After the fuse has blown, it is only necessary then to change the fuse 16, by unscrewing the screw 12 which enables the tongue 17 and the insulating ring 15 to be removed. It will be noted that the location of the fuse 16 within the ring 15 enables any interference with the first power supply tongue 17 to be avoided. It also enables any interference with the connectors which are shown in silhouette in FIGS. 1 and 8, and which are connected on the axial portions (shouldered for this purpose) of the power supply tongues 17 and 18, to be avoided.

In general in the accompanying drawings, the fuse 16 is mounted within a cavity 95 which is formed for this purpose in the second insulating ring 15 (see FIGS. 1 and 6). The cavity 95 is closed, in this example almost entirely, by an outer wall portion of the ring 15, which masks the fuse 16. The wall portion 16 envelops the capsule 70 of the fuse 16, and has a transversely oriented base portion parallel to the base portion 34 of the body sleeve 6 and parallel to the main portion of the insulating ring 15. This base portion masks the fuse 16 and is offset axially with respect to the insulating ring 15, being therefore spaced further away in the axial direction from the base portion 34 of the body sleeve 6 than is the main portion of the ring 15. The transverse base portion of the wall portion 96 is joined through a chamfer to the side edge, or skirt, of the ring 15, as can be seen in FIGS. 1 and 6.

The capsule 70 of the fuse 16 is inserted from the side, in relation to the axial portions of the tongues 17 and 18. The second insulating ring 15 therefore has a lateral projecting part, which is no inconvenience because there is enough room between the base portion 34 of the body sleeve 6 and the female connector or connectors which are fitted onto the tongues 17 and 18.

It will be noted that, due to the axial offset of this transverse base portion of the wall portion 96 with respect to the main portion 80 of the insulating ring 15, a slot is defined between the ring 15 and the wall portion 96 that masks the capsule 70 of the fuse 16, so that the latter is protected by the wall portion 96. The cavity 95 is therefore defined locally in the thickness of the main portion 80 of the ring 15, so that, in FIGS. 1 to 11, the fuse 16 lies on either side of the main portion of the ring 15. This gives a reduction in overall axial size.

Any contact between the fuse 16 and/or the wiring close to which the lighter body A is fitted, is thus avoided. The fuse 16 is in no danger of being damaged. In addition, before the cigar lighter is fitted on the fixed wall P of the vehicle, accidental damage is avoided during storage of the lighter body unit, and during transport and handling.

Figure 4:
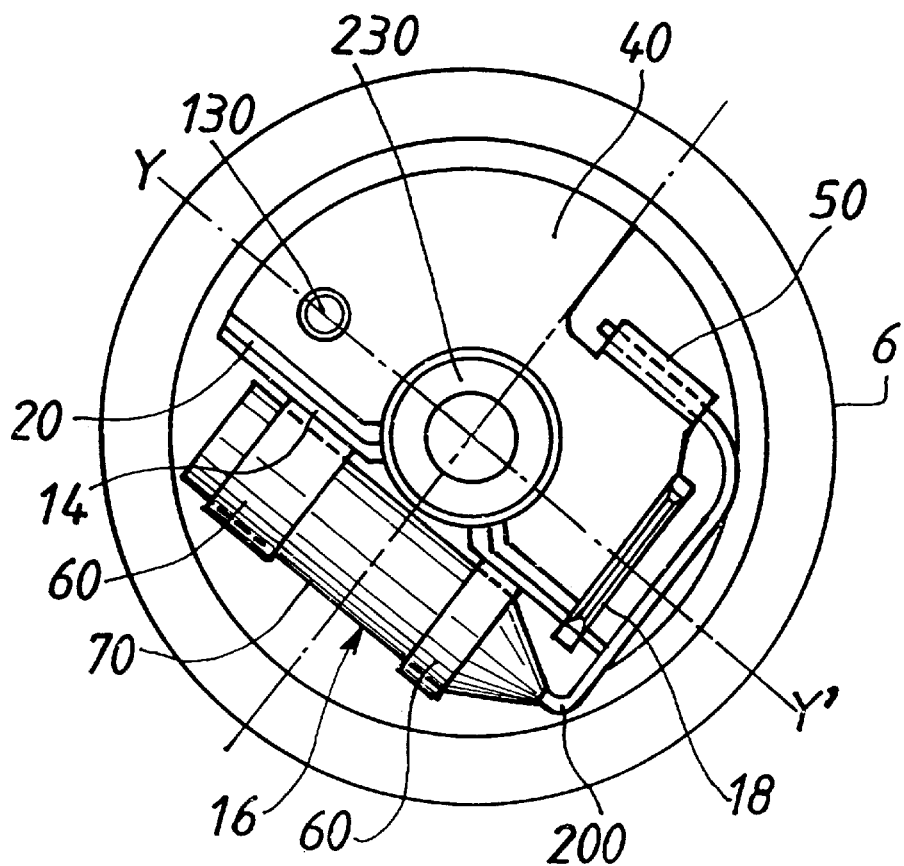
FIG. 4 is an end view of the cigar lighter shown in FIG. 1, with the second insulating ring and the first power supply tongue being omitted in order to show the fuse and the second power supply tongue.

In the first embodiment shown in FIGS. 1 to 5, the fuse is carried by a fuse carrier 14, which in this example is of metal and therefore electrically conductive. The fuse carrier 14, which is a separate component from the tongue 18, is in contact with the base portion 34 of the metal body sleeve 6 (see FIG. 5). The carrier 14 is generally in the form of a disk which is extended by a truncated axially oriented portion, so as to define two fuse mounting lugs 60 which are spaced apart from each other as can be seen in FIG. 4. The lugs 60 are circular as shown in FIG. 1, and extend over an arc greater than 270°. Their radius depends on the radius of the capsule 70 of the fuse 16, so that the fuse can be inserted into the lugs 60 from one end, the lugs being resilient. Depending on the application, only one fuse mounting lug 60 may of course be provided.

It will be noted that the capsule 70 of the fuse 16 lies generally at right angles to the axial portion of the second power supply tongue 18. The fuse 16 extends laterally with respect to the diametral axis Y–Y' in FIG. 4, being parallel to the latter.

Figure 5:
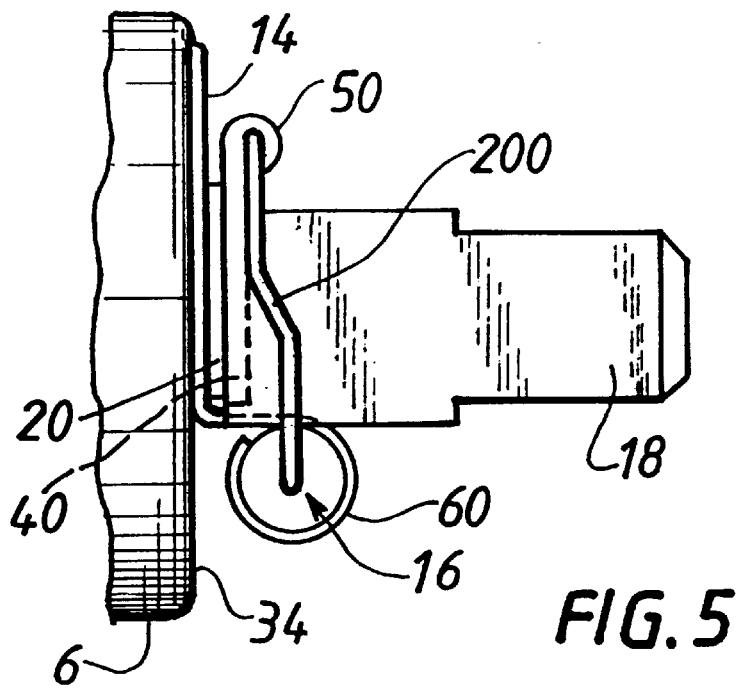
FIG. 5 is an outside view of a portion of the cigar lighter, viewed from the right hand side of FIG. 4 in a direction generally parallel to the axis Y–Y' in FIG. 4.

The contact element 200 is in the form of a wire, so that it passes around the axial portion of the second power supply tongue 18, to be fixed on the base portion 40 of the tongue 18, as shown in FIGS. 4 and 5, thereby making electrical contact between the base portion 40 and the contact element 200. More precisely, the base portion 40 has contact means in the form of a rolled lug 50, which is crimped over the end of the contact wire 200. It will be noted that the base portion 40 is easily formed by stamping, with the lug 50 being rolled.

For more detail as to the form of the base portion 40, reference is made to FIG. 4. Here, the base portion 40 is in the form of a disk which is truncated parallel to the axis Y–Y', so as to define a space in which the capsule of the fuse 16 can be mounted. The base portion 40 is also truncated so as to define the contact lug 50 crimped around the contact wire 200. The fuse 16 therefore lies in superelevation with respect to the base portion 34 of the lighter body sleeve 6, with a clearance separating the fuse mounting lugs 60 from the base portion 34. With reference to FIG. 5, it can be seen that the fuse carrier 14 is generally C-shaped in cross section, with a transverse portion in contact with the base portion 34 and an axially oriented portion which carries the mounting lugs 60.

The electrically insulating washer 20 is interposed axially between the base portion 40 and the transverse portion of the fuse carrier 14. The second insulating ring 15 defines a pressure plate, for which purpose it has an internal rib (not indicated by a reference numeral), which cooperates with the outer periphery of the centring sleeve portion 230 (FIG. 4) of the first insulating ring 13. The free end of this internal rib, which extends towards the base portion 34, bears on the base portion 40 so that the latter, together with the washer 20 and the fuse carrier 14, are gripped between the ring 15 and the base portion 34, being assembled to the base portion 34 by means of the fastener 12 in engagement with the tongue 17.

It will be appreciated that the second tongue 18 is of a simple form, and that it is located against rotation, by means of a locating peg 130 with which the first insulating ring 13 will normally be provided. This peg 130 projects laterally from the ring 13, and extends, via holes which are aligned axially with each other, through the base portion 34, the fuse carrier 14, the washer 20, and the base portion 40, so as to engage with an aperture formed in the ring 15. The latter is thus prevented from rotating.

The following standard components of a conventional cigar lighter are retained: the first power supply ring 17, the first insulating ring 13, the two-fingered clip 11, and the screw 12. The first insulating ring 13 extends centrally, by means of its centring sleeve portion 230, through the insulating washer 20, the fuse carrier 14 and the base portion 40 of the second tongue 18, as can be seen in FIG. 1, these components having holes for this purpose.

It is only the second insulating ring 15 and the base portion of the second power supply tongue 18 that are modified in order to adapt the cigar lighter to the purposes of the invention, and even then, this modification is simple. The protective device provided by the invention is therefore particularly inexpensive.

The same advantages are afforded by the embodiment shown in FIGS. 6 to 11. In these Figures, the fuse carrier 14 of FIGS. 1 to 5, as a separate component, is omitted. In FIGS. 6 to 11, the capsule 70 of the fuse 16 is in direct contact with the base portion 34 of the lighter body sleeve 6. The outer wall portion 96 of the insulating ring 15 masks the capsule 70 of the fuse 16 as in FIGS. 1 to 5. The wall portion 96 has the same form, and accordingly has a transverse portion which is offset axially with respect to the main portion 80 of the second insulating ring 15, having a lateral skirt. The fuse 16 lies on either side of the main portion 80.

It will be appreciated that the axial dimension between the base portion of the wall portion 96 and the base portion 34 of the body sleeve 6 can be reduced as compared with the embodiment of FIGS. 1 to 5. In a modified version, having the same axial dimensioning as FIGS. 1 to 5, a fuse 16 with a cylindrical capsule of larger diameter may be fitted.

It will be appreciated that the fuse is substantially insensitive to vibrations, because it is trapped between the wall portions 96 and 34, as can be best seen in FIG. 6. The fuse is fitted from the side in the same way as in FIGS. 1 to 5.

Figure 9:
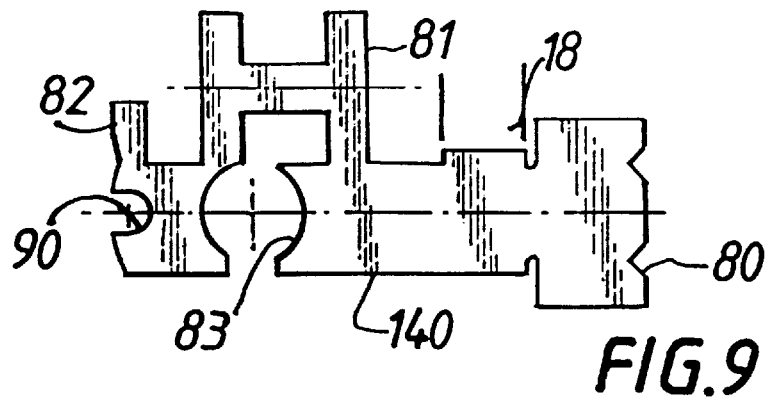
FIG. 9 shows the second power supply tongue of FIG. 6, after being stamped from the blank but before being bent so as to form various portions of the tongue.

In this second embodiment the second power supply tongue 18 has a modified form. It is however again made by stamping and pressing followed by bending and rolling. In this embodiment, the second power supply tongue 18 is initially flat (i.e. in the form of a plate), as can be seen in FIG. 9, which shows the tongue 18 in the form of a flat, stamped out, blank. It has a circular aperture 83 for accommodating the first insulating ring 13, and more precisely the central sleeve portion 230 of the latter, which passes centrally through the base portion 34 as shown in FIG. 6. The blank 18 in FIG. 9 also has, at one of its axial ends, a notch 90 for accommodating the above mentioned peg or spigot 130 of the first insulating ring 13, and for preventing the second power supply tongue 18 and second insulating ring 115 from rotating in the manner already described. The notch 90 is of generally semicircular form.

At its other end, the flat blank 18 has a widened portion 80 which is formed with V-shaped notches. Above the circular aperture 83 it has an H-shaped portion 81, and, close to the notch 90, a projecting portion 82.

The inner surface of the blank, which constitutes the surface of the tongue 18 that faces towards the base portion 34, is powder coated with the above mentioned electrically insulating coating 120. This coating is applied on the H-shaped portion 81, but not on the projecting portion 82. It may or may not extend onto the widened portion 80.

In a modified, and preferred, version, the insulating coating 120 may be of an adhesive type, and may for example be in the form of a pressed-out leaf, which is positioned in the required position on the flat blank of FIG. 9 and then secured to the latter by self-adhesion.

The blank of FIG. 9 is then reformed as follows. The widened portion 80 is bent through 90° by bending at the V-shaped notches of the portion 80, so as to double the thickness of the tongue 18 in this region, and so as to form the above mentioned axial portion of the latter. It will be noted that the widened portion 80 is separated from the main portion of the tongue 18, which constitutes the base portion 140 of the second power supply tongue, by slots which enable a shoulder to be defined.

Figures 10, 11:
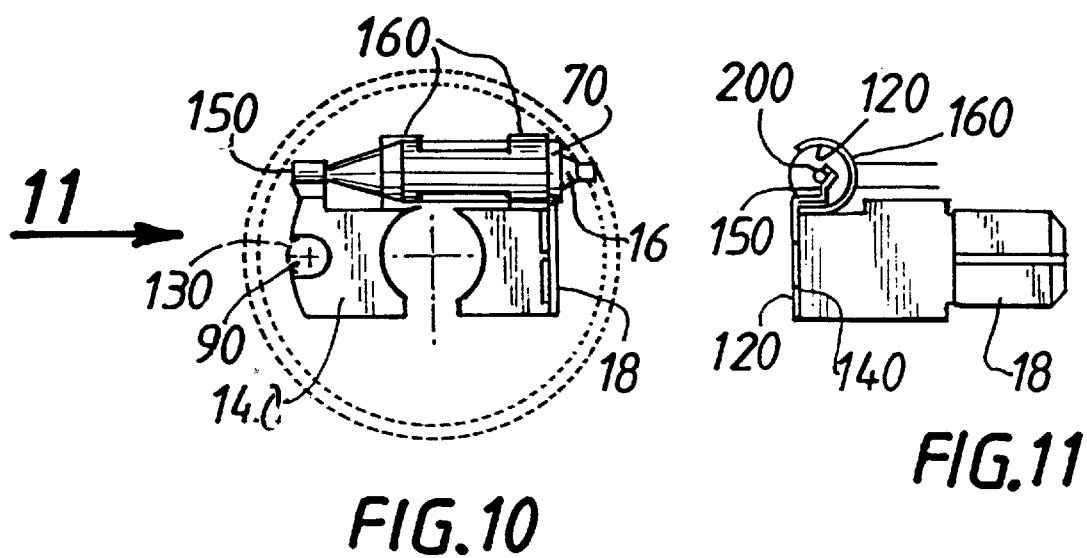
FIG. 10 shows the components seen in FIG. 9, after bending and/or rolling of the portions concerned of the second power supply tongue.
FIG. 11 is a view in the direction of the arrow 11 in FIG. 10.

The H-shaped portion 81 is reformed by rolling, so as to form a double fuse mounting lug 160 for carrying the capsule of the fuse 16. More precisely, the vertical elements, i.e. the two parallel legs, of the H-shaped portion 81 are rolled so as to form the circular lugs, which extend over more than 180° and which are joined together by the horizontal portion of the H. The projecting portion 82 is also rolled to shape so as to form the contact lug 150, for making electrical contact with the contact element 200 of the fuse 16. Reference is made to FIG. 11 in regard to the form of this lug, which is generally L-shaped, with an axial portion projecting from the base portion 150, together with a transverse or vertical V-shaped terminal portion for containing the contact wire 200 and for electrical cooperation with the latter. The vertical portion of the lug 150 is thus so configured as to make electrical contact with the contact element 200 of the fuse 16.

As will be gathered from the foregoing description and the drawings, the connection between the fuse 16 and lug 150, which is in this example elastic, is shorter than in FIGS. 1 to 5. The lug 150 is in elastic contact with the contact element 200, which makes it easier to change the fuse 16. Because of the coating 120, it can be seen that the capsule 70 is electrically insulated from the double fuse mounting 160. The coating 120 may consist of an independent polyester film. Preferably, this is a polyester shrink film resistant to tearing, for example "Mylar". The coating 120 will be attached firmly to the second tongue 18 due to the fuse and fuse mounting lug 160.

It will be appreciated that the form of the lug 160 is of particular advantage, because it enables the independent coating 120 to be properly retained, especially because of the horizontal portion of the H derived from the H-shaped portion 81. The coating can shrink so as to hug the profile of the fuse 16, so that it retains the profile of the fuse when the fuse is changed. This again makes replacement of the fuse easier. A sub-assembly can thus be formed, consisting of the tongue 18, the fuse 16 and the coating 120, due to the lug 160.

In short, it can be seen that the second power supply tongue 18 can be made in an extremely simple way. It will also be appreciated that, in the sub-assembly mentioned above, the coating can consist of an independent piece as described above, by virtue of the lug 160. This makes manufacture of the lighter body A very much easier and reduces its assembly time.

After assembly, the fuse 16 is trapped between the double lug 160 and the base portion 34, and is protected by the wall portion 96.

The same advantages are retained as in FIGS. 1 to 5, in particular that of retaining the greatest possible number of components of a conventional cigar lighter.

The second insulating ring 15 is preferably made by moulding. The ring 15, because of its skirt portion and its wall portion 96 in particular, protects the base portion 140 of the second power supply tongue 18, and also the lugs 150, 160 and the fuse 16. The embodiment of FIGS. 6 to 11 is highly resistant to mechanical shock, and is more reliable because the fuse is in direct contact with the base portion 34.

As in FIGS. 1 to 5, the above mentioned internal rib, of the ring 15, which is centred by the centring sleeve portion 230 of the first insulating ring 13, serves for holding the base portion 140, with its internal insulating coating 120, in contact with the base portion 34, and for assembly of the tongue 18 (carrying the fuse 16) to the base portion 34 by means of the fastener 12. In all of the Figures, the internal rib of the ring 15 is interrupted by the cavity 95, but this is no disadvantage.

The fastening member 12 may of course consist of a bolt, with the tongue 17 not being threaded. In general terms, the fastening member 12 should preferably be of a removable type in order to enable the fuse to be easily changed. In another version, the contact element 200 may be soldered directly onto the base portion 40 or 140 of the second power supply tongue 18.

In general, the second power supply tongue 18 carries contact means 50, 150 for making electrical contact with the contact element 200 of the fuse 16, the contact element 200 being shorter in the second embodiment (FIGS. 6 to 11). The fuse carrier 14 or the tongue 18 (where the latter constitutes a fuse carrier) is preferably provided with the gripping means such as the lugs 60 or 160 for removably carrying the fuse 16. This enables a separate insulating layer to be provided which will be retained in position by the fuse and by the gripping means, in the manner described above.

The gripping means 60 or 160 constitute fastening means for the fuse 16. Such fastening means may however take some other form, and may for example be of a rigid type. For example, it is possible, using an electrically insulating adhesive layer or an electrically insulating film, to adhesively fasten the fuse 16 on its fuse carrier 14 or 18. Similarly, the washer 20 in FIGS. 1 to 5 may be secured adhesively to the fuse carrier 14 and to the tongue 18, so as to form a subassembly.

In general, instead of changing only the fuse 16 when the latter blows, it can be arranged, so as to make the changing operation quicker, that the fuse is changed together with its associated fuse carrying member 14 or 18. In that case, in the second embodiment (FIGS. 6 to 11), the lug 150 may be soldered on to the contact element 200, that is to say on the end of the fuse 16.

What is claimed is:

1. A cigar lighter comprising:
    a lighter body and a heater plug removably received in the lighter body, the lighter body comprising:
        an electrically conductive lighter body sleeve having a base portion defining the interior of the body sleeve on one side of said base portion;
        a two-fingered clip in the interior of the body sleeve for releasable engagement with the heater plug;
        a first insulating ring in the body sleeve;
        a first power supply tongue outside said body sleeve;
        a second power supply tongue associated with said body sleeve and disposed outside the body sleeve and close to said base portion of the body sleeve;
        a second insulating ring interposed axially between said first and second power supply tongues;
        a fastening member connecting said first power supply tongue and said clip electrically together, said fastening member further assembling together said clip insulating rings, power supply tongues and lighter body sleeve; and
        a protective device for protection against overheating, wherein the lighter body further includes electrical insulating means interposed between said second power supply tongue and the base portion of the body sleeve, and a fuse holder secured by said fastening member to the base portion of the body sleeve, said protective device comprising an electrical and thermal safety fuse for protecting the cigar lighter against overheating and excess current, said fuse connecting the second power supply tongue electrically to the base portion of the body sleeve, said second insulating ring being configured so as to mount the fuse holder therewithin, with the fuse mounted in the fuse holder.

2. A cigar lighter according to claim 1, wherein the fuse holder is an electrically conductive component separate from the second power supply tongue, the fuse holder in electrical contact with the base portion of the body sleeve.

3. A cigar lighter according to claim 2, wherein said second power supply tongue has a base portion parallel to the base portion of the body sleeve, said electrical insulating means interposed between the fuse holder and the base portion of the second power supply tongue, the second power supply tongue having means for making electrical contact with one end of the fuse.

4. A cigar lighter according to claim 2, wherein the fuse holder includes fuse mounting means retaining said fuse in a position spaced away from the base portion of the body sleeve.

5. A cigar lighter according to claim 4, wherein said fuse mounting means includes gripping means comprising at least one gripping lug bent in a circle, the fuse comprising a cylindrical capsule, said at least one gripping lug configured so as to embrace said capsule.

6. A cigar lighter according to claim 1, wherein a terminal of the fuse holder is integrally formed with said second power supply tongue, and the fuse holder includes fuse mounting means for carrying the fuse, whereby the fuse is carried directly by the second power supply tongue, the fuse mounting means further including means insulating the fuse from said mounting means.

7. A cigar lighter according to claim 6, wherein the fuse includes an external contact element, the fuse mounting means comprising gripping means for carrying said fuse, the second power supply tongue further including contact means for electrical contact with said contact element of the fuse.

8. A cigar lighter according to claim 7, wherein the second power supply tongue includes an H-shaped portion having two parallel projecting elements which are formed by rolling, so as to constitute said gripping means in the form of a double gripping lug.

9. A cigar lighter according to claim 7, wherein said contact means comprise a generally L-shaped lug having a projection portion configured for electrical contact with said contact element of the fuse.

10. A cigar lighter according to claim 1, wherein the fuse comprises:
    a hollow capsule, and, within the capsule: a fusible thermal pellet; a first disk in contact with said pellet; a second disk; a compression spring interposed between said first and second disks; a contact disk in contact with said second disk and with said capsule; a profiled contact element extending out of the capsule, said contact element being profiled for contact with said contact disk; a ceramic insulator surrounding said contact element; and an opening spring bearing on the ceramic insulator and on said contact disk so as to act on the contact disk.

11. A cigar lighter according to claim 1, wherein said second insulating ring defines a cavity within it, said cavity containing said fuse.

12. A cigar lighter according to claim 11, wherein said second insulating ring includes a wall portion closing at least a major part of said cavity and masking the fuse, the fuse having an outer capsule, said wall portion enveloping said outer capsule.

13. A cigar lighter according to claim 12, wherein said second insulating ring includes a main portion oriented transversely of the lighter body sleeve, said wall portion of the second insulating ring having a base portion oriented transversely parallel to the base portion of the body sleeve and to said main portion of the second insulating ring.

14. A cigar lighter according to claim 13, wherein the main portion of the second insulating ring is spaced axially away from the base portion of the body sleeve by a first amount, and said base portion of the wall portion is offset axially with respect to said main portion, so as to be spaced axially from the base portion of the body sleeve by a second amount greater than said first amount.

15. A cigar lighter according to claim 14, wherein the second insulating ring further includes a lateral edge and defines a chamfer joining said lateral edge to said base portion of the wall portion of the ring.

16. A cigar lighter according to claim 12, wherein the fuse lies on either side of said main portion of the second insulating ring.

17. An apparatus comprising:
a clip disposed in the interior of the housing of a cigar lighter for releasable electrical engagement with a heater plug;
first and second power supply tongues projecting externally of the housing;
a fuse holder disposed to retain inside the housing a fuse in an arrangement for electrical and thermal protection of the lighter, the fuse holder arranged to electrically connect the second power supply tongue to an electrical base of the lighter through the fuse;
an inter-tongue insulator between the first and second power supply tongues, structurally mounting a first terminal of the fuse holder and retaining the fuse holder within the housing;
a fastening member electrically joining the first power supply tongue and the clip, and structurally retaining the first and second supply tongues, the inter-tongue insulator, and an insulator between the second power supply tongue and the electrical base.

18. The apparatus of claim 17, further comprising an electrically conductive lighter body sleeve which in turn includes the electrical base, the base defining the interior of the body sleeve on one side of the base portion, the sleeve electrically connecting the heater plug to a second terminal of the fuse holder.

19. The apparatus of claim 17, wherein the inter-tongue insulator is in the form of a ring.

20. The apparatus of claim 17, the first fuse holder terminal being an electrically conductive component formed separately from the second power supply tongue.

21. The apparatus of claim 17, a second fuse holder terminal being electrically connected to the base portion of the body sleeve.

22. The apparatus of claim 17, wherein the second power supply tongue has a base portion parallel to the base portion of the body sleeve, the inter-tongue insulator is interposed between the fuse holder and the base portion of the second power supply tongue.

23. The apparatus of claim 17, wherein the fuse holder includes fuse mounting means retaining the fuse in a position spaced away from the base portion of the body sleeve.

24. The apparatus of claim 17, wherein a terminal of the fuse holder is integrally formed with the second power supply tongue.

25. The apparatus of claim 24, wherein the second power supply tongue includes an H-shaped portion having two parallel projecting elements formed by rolling, so as to constitute the gripping means in the form of a double gripping lug.

26. The apparatus of claim 24, wherein the contact means comprise a generally L-shaped lug having a projection portion configured for electrical contact with a contact element of the fuse.

27. The apparatus of claim 17, wherein the fuse comprises:
a hollow capsule, and, within the capsule a fusible thermal pellet;
a first disk in contact with the pellet;
a second disk;
a compression spring interposed between said first and second disks;
a contact disk in contact with the second disk and with the capsule;
a profiled contact element extending out of the capsule, the contact element being profiled for contact with the contact disk;
a ceramic insulator surrounding the contact element; and an opening spring bearing on the ceramic insulator and on the contact disk so as to act on the contact disk.

28. The apparatus of claim 17, wherein the inter-tongue insulator is a ring defining a cavity for containing the fuse.

29. The apparatus of claim 28, wherein the inter-tongue insulator includes a main portion oriented transversely of the lighter body sleeve, the wall portion of the inter-tongue insulator having a base portion oriented transversely parallel to the base portion of the body sleeve and to the main portion of the inter-tongue insulator.

30. The apparatus of claim 29, wherein the inter-tongue insulator further includes a lateral edge and defines a chamfer joining the lateral edge to the base portion of the wall portion of the ring.

31. A motor vehicle, including the apparatus of claim 17.

* * * * *